UNITED STATES PATENT OFFICE.

JAMES MALCOLM, OF NEW YORK, N. Y.

IMPROVEMENT IN COLORED INDIA-RUBBER AND GUTTA-PERCHA COMPOUNDS.

Specification forming part of Letters Patent No. 51,846, dated January 2, 1866.

*To all whom it may concern:*

Be it known that I, JAMES MALCOLM, of New York, in the county and State of New York, have invented certain new and useful Improvements in the Manufacture of Colored Vulcanized India-Rubber or Gutta-Percha Compounds; and I hereby declare that the following is a full, clear, and exact description of the same.

But imperfect results were obtained from the methods heretofore known and practiced of coloring vulcanized india-rubber or gutta-percha compounds. The color desired either could not be produced, or the colored rubber when vulcanized was too brittle to become fit for practical uses, or both the color and rubber were deteriorated by action of heat.

The object of my invention, therefore, is to produce colored rubber by incorporating in the vulcanizable compound ingredients prepared in such a manner as that, when submitted to the ordinary process of vulcanization and to the processes of developing color, the vulcanized rubber or gum obtained, whether soft or hard, will be of a permanent color, of the desired tint or shade.

To enable others to make and use my invention, I shall now proceed to describe the manner in which the same is or may be carried into effect.

The rubber, gutta-percha, or other vulcanizable gum is prepared for vulcanization in the manner well known to rubber-manufacturers by combining it with sulphur. With the rubber compound I use a pigment or coloring-matter or base for the coloring-matter, which is the sulphuret of zinc. There are two ways of preparing this substance—*i. e.*, by precipitation and by fusion. The sulphuret of zinc obtained by the latter process produces a brittle compound. I therefore prefer to use the one obtained by heating metallic zinc in presence of flower of sulphur, or by igniting the dry oxide of zinc in the sulphur. The sulphuret of zinc thus obtained is placed in a retort heated to white heat. This, too, I deem essential to my improvement. When the sulphuret of zinc is prepared in the manner described it is sifted to a fine impalpable powder, and may then be incorporated with the vulcanized rubber or gutta-percha compound. The object of thus treating the rubber is to give it a whitish or cream color without rendering it brittle, as is the case when the white oxide of zinc is mixed with the compound.

If it be desired to give the rubber a red or reddish color or hue, vermillion or other suitable coloring-matter may be mixed with the sulphuret of zinc in various proportions. Other coloring ingredients may be mixed to produce different effects of color and tint.

The compound thus prepared may be run into plastic sheets and sold as such, to be fashioned into various articles previous to vulcanization. For dental purposes, for instance, the sheets may be formed into plates for the reception of artificial teeth and vulcanized.

After vulcanization the article, if it be hard rubber, is polished and exposed to solar rays for a few hours, more or less. By immersing the vulcanized compound in alcohol while exposed to solar rays the color is more perfectly developed. By thus proceeding the intended color will be developed.

The rubber compound in which the pigment described is used is prepared in the usual manner with reference to the intended degree of hardness or elasticity.

Vulcanized rubber may thus be produced colored or tinted and possessing various degrees of hardness by changing the proportions of the ingredients named or by mixing therewith other ingredients.

Having thus described my said invention and the manner in which the same is or may be carried into effect, I claim—

1. Combining with india-rubber or other vulcanizable gum and sulphur a pigment prepared in the manner herein described, (and I claim this combination, whether the said compound or sulphur, gum, and pigment be or be not mixed with the other ingredients,) as set forth.

2. The method of producing colored vulcanized india-rubber or such other gum by combining with the gum sulphur and a pigment prepared as described, and by subjecting such compound to vulcanizing-heat, as set forth.

3. The method of producing colored vulcanized india-rubber or such other gum by combining with the gum sulphur and a pigment prepared as described, and by subjecting such compound to vulcanizing-heat, and by exposing the vulcanized compound to solar rays, whether immersed or not in alcohol.

In testimony whereof I have signed my name to this specification before two subscribing witnesses.

JAMES MALCOLM.

Witnesses:
A. POLLOK,
D. B. DUDLEY.